United States Patent [19]

Stone et al.

[11] 4,452,329

[45] Jun. 5, 1984

[54] SUSPENSION FOR A TRUCK TILT CAB

[75] Inventors: Thomas R. Stone, Hayward; Roger P. Penzotti, Livermore, both of Calif.

[73] Assignee: Paccar Inc., Bellevue, Wash.

[21] Appl. No.: 449,265

[22] Filed: Dec. 13, 1982

[51] Int. Cl.³ .............................................. B62D 27/00
[52] U.S. Cl. .................................. 180/89.15; 296/190
[58] Field of Search ................. 180/89.1, 89.14, 89.15, 180/89.16, 90.6; 280/771, 775, 702, 714; 296/35.3, 196, 190

[56] References Cited

U.S. PATENT DOCUMENTS

| | | | |
|---|---|---|---|
| 3,026,103 | 3/1962 | Gates | 280/714 |
| 3,101,809 | 8/1963 | Hostetler et al. | 180/89.15 |
| 3,165,164 | 1/1965 | Hostetler et al. | 180/89 |
| 3,312,303 | 4/1967 | Milloy | 180/89.14 |
| 3,393,005 | 7/1968 | Herrmann et al. | 296/28 |
| 3,420,568 | 1/1969 | Henriksson et al. | 180/89.1 |
| 3,606,437 | 9/1971 | Pierce | 296/35 |
| 3,618,692 | 11/1971 | Stikeleather | 180/89 |
| 3,642,316 | 2/1972 | Porth et al. | 296/28 C |
| 3,661,236 | 5/1972 | Wossner | 188/315 |
| 3,667,565 | 6/1972 | Steiner et al. | 180/89 |
| 3,733,087 | 5/1973 | Allison | 280/96.2 R |
| 3,797,883 | 3/1974 | Steiner et al. | 296/35 R |
| 3,831,999 | 8/1974 | Sonneborn | 180/89.15 |
| 3,841,694 | 10/1974 | Merkle | 296/35 R |
| 3,853,368 | 12/1974 | Eichelsheim | 180/89.15 |
| 3,944,017 | 3/1976 | Foster | 180/89 A |
| 3,948,341 | 4/1976 | Foster | 180/89 A |
| 4,081,053 | 3/1978 | Sherman | 180/89.15 |
| 4,327,810 | 5/1982 | Jorda | 180/89.15 |

FOREIGN PATENT DOCUMENTS 637875 3/1962 Canada .
1430735 12/1968 Fed. Rep. of Germany .

*Primary Examiner*—Richard A. Bertsch

*Attorney, Agent, or Firm*—Owen, Wickersham & Erickson

[57] ABSTRACT

A tilt-cab truck with the cab independently suspended on the main frame. A power device for tilting is connected to the cab and the frame at pivots spaced away from the main cab pivot. On each side of the truck a front suspension bell crank is pivoted to the cab by a main pivot and has an arm extending substantially horizontally back to a pivotal connected to the main frame, with a crank arm extending down from the rear and bearing on one end of a horizontal front air spring that is secured to the main frame at its other end. A leveling valve assembly for maintaining cab height relative to the frame is connected to the front air springs and to a source of air pressure. An anti-roll structure is rigidly connected at each end to the bell crank and extends down below it and then laterally across to the other side of the truck. A pair of lower latch assemblies are each secured to the main frame near the rear of the cab, and a pair of upper latch assemblies are each releasably secured to a lower latch assembly. A pair of horizontal rear links are each pivotally connected at a forward end to the cab and at a rear end to an upper latch assembly, and a pair of rear air springs are each mounted on an upper latch assembly with an upper end bearing against the cab. A leveling valve assembly for each rear air spring is connected to the source of air pressure, for maintaining the cab height relative to the frame. A pair of front damper-snubbers, each adjacent to the main pivot, are operatively interposed between the cab and the main frame, and a pair of rear damper-snubbers, each adjacent to the rear end of one rear link, are interposed between the cab and the upper latch assembly, each damper-snubber has hydraulic cushioning for preventing bottoming out at each end of its stroke.

43 Claims, 14 Drawing Figures

SUSPENSION FOR A TRUCK TILT CAB

This invention relates to a novel and improved four-point suspension for the cab of a tilt-cab truck. It also relates to improved interfaces required between the cab and the frame of such a truck.

GENERAL BACKGROUND OF THE INVENTION

In trucks that carry heavy loads, typically on semi-trailers, the primary suspension system, i.e., the suspension system between the axles and the frame, has been plagued by the problem of providing for heavy loads without excessive static deflection while isolating the frame and the cab from shock and vibration. Suspensions utilizing mechanical springs were unable to solve the problem completely, for springs of relatively high rate are needed in order to support the load without excessive static deflection, but such springs are not very effective at shock and vibration isolation.

The introduction of air spring suspensions with active leveling helped considerably, for with air springs (1) a fairly low spring rate can be used without worry of excessive static deflection; undue settling under load can be prevented by automatically increasing the pressure in the air springs until the desired ride height is reached, and (2) the spring rate is proportional to the internal pressure of the air spring, and this is proportional to the load supported, so that air spring suspension systems inherently have a constant natural frequency, regardless of load.

However, despite these improvements, the ride quality of typical trucks has left much to be desired. A feasible way of improving ride quality is to provide a secondary suspension system interposed between the frame and the cab. The present invention relates to improvements in this kind of system.

Heretofore, there have been systems supporting only the rear of the cab by a spring, but this approach has had limited effectiveness. Four-point suspension systems utilizing metal springs have been somewhat more effective, but it has been difficult to get a spring rate low enough for really good vibration isolation without encountering problems with excessive static deflection.

A four-point cab suspension using air springs is shown in two U.S. patents to Foster, U.S. Pat. Nos. 3,944,017 and 3,948,341, the latter patent applying to a tilt-cab truck. While this system provided an improved ride, the system has generated and failed to solve a variety of problems. These include:

1. The Foster system uses conventional automotive hydraulic shock absorbers with internal elastic jounce and rebound stops. The type of damping these shock absorbers provide is not appropriate for a secondary suspension system, and the use of elastic stops necessitates a very large amount of system travel, i.e., vertical movement of the cab relative to the frame, of several inches, which in turn leads to several difficulties, enumerated below.

2. The large vertical movement of the cab relative to the frame, as described above, has precluded the use of any of the usual simple means of actuating the clutch, and has made necessary the use of a hydraulic clutch actuation system. Such systems are notoriously expensive and trouble-prone.

3. The shift tower and subfloor arrangement used in Foster's invention has been inadequate to prevent the intrusion of objectionable noise and fumes into the cab. Furthermore, in Foster's system, the shift lever is affixed to the vehicle frame, which results in a large and objectionable amount of relative motion between the driver and the shift knob as the cab moves up and down on its suspension.

4. There has been excessive roll of the cab from side to side.

Each of these problems is briefly discussed in somewhat more detail:

1. The use of conventional automotive shock absorbers

There are fundamental differences between primary and secondary suspension systems. Primary suspensions must be able to handle whatever the road presents; so the total travel must be at least equal to the sum of the height of the largest bump plus the depth of the deepest hole likely to be encountered—typically five or six inches total. In contrast, secondary suspension systems need only handle the relatively small amplitude inputs which the primary suspension system fails to remove, plus the motions due to the resonant vibration of the chassis itself. Hence, a secondary suspension system need only provide a small amount of travel, provided it is protected against bottoming out by means of appropriate end-of-stroke cushioning.

Considering the differences in more detail, primary suspensions have to handle occasional sudden large-amplitude displacements, such as those caused by striking large rocks, pieces of lumber, etc., without transmitting destructive shock loads into the vehicle frame. Most automotive shock absorbers therefore utilize internal "blow-off" valving which prevents some predetermined maximum force from ever being exceeded, and this characteristic gives a "velocity-softening" force-velocity relationship. In addition, since these high shock loads are judged more likely to occur in the jounce direction than in the rebound direction, most automotive shock absorbers have a substantially smaller damping coefficient in jounce than in rebound, the theory being that the light jounce damping allows the wheel to "get out of the way" of the obstacle, while the heavier rebound damping ensures that any subsequent oscillations of the wheel will be quickly damped out.

Conversely, a secondary suspension system is not expected to handle sudden large-amplitude displacements, or to offer protection from high shock loads, but only to isolate the cab from relatively small-displacement motions of the chassis which are characterized by roughly equal acceleration levels at all pertinent frequencies. It can be demonstrated that, for such conditions, a damper with velocity-stiffening characteristics will give vibration isolation superior to that delivered by one with velocity-softening characteristics. Hence, one object of this invention is to provide the four-point cab suspension with vibration isolation means providing velocity-stiffening damping.

Furthermore, in a secondary suspension system, there is no longer any overriding need to have different damping characteristics in the jounce and rebound directions; instead, the jounce and rebound damping may be made identical, and the present invention does so.

Since four-point cab suspension employing air springs with automatic leveling keeps the ride height of the cab relative to the frame always the same, regardless of the load carried by the cab, the damper always oscillates about its mid-stroke position. Thus, it becomes possible to employ a center-seeking damper. Hence, another object of the invention is to provide a center-seeking damper solving the problems of excessive travel and of bottoming out at extreme positions.

An additional object of the invention is to limit the total range of movement of the cab relative to the frame, for example, to only about $\pm \frac{3}{8}$ inch.

2. The problems relating to mechanical clutch linkages for tilt-cab vehicles with cab suspension.

Despite the availability of automatic transmissions for today's highway trucks, most modern trucks are equipped with multi-speed manual transmissions for a variety of performance, fuel economy, and reliability considerations. Consequently, most trucks also utilize manually operated clutching means in order to control engagement of the engine with the transmission.

Truck and automobile clutches nearly always employ some type of pedal control which is normally actuated with the driver's left foot. The pedal is usually mounted on an arm which in turn is connected to a shaft about which the pedal pivots. At the clutch housing, a shaft and arm assembly is usually employed to receive the motion transmitted from the pedal. A variety of linkages have been employed to translate the motion at the clutch pedal into motion at the clutch control arm, such as: (1) link and bellcrank arrangements, (2) jacketed "push-pull" type cables, (3) hydraulic actuation, (4) air pressure actuation, and (5) open cable and pulley systems.

Some type of power assist has often been tried in order to reduce the effort at the clutch pedal, but power-assisted clutches, while sometimes used, are generally avoided due to their complexity, their maintenance and reliability problems, and their loss of clutch "feel". If some type of power assist is not utilized, then it is quite important to minimize lost work due to friction and elasticity in the system and to tailor the system to keep both pedal stroke and effort within acceptable limits. Hydraulic clutch controls are quite bad in this regard since seal friction in the cylinders can add substantially to the effort required of the driver. While modern jacketed cables can be made relatively frictionless, they are costly and vulnerable to internal corrosion and to kinking during cab tilting operations.

Thus, link-and-bellcrank and cable-and-pulley arrangements have afforded the best prospects for simplicity of design, low friction, and long trouble-free life. In a typical such cable-and-pulley system the clutch pedal has been connected to a bell crank pivoting on a shaft. A cable attached to the other end of the bellcrank by a swivel fitting has extended down through a hole in the cab floor, passed around a pulley pivotally attached to the chassis, and then passed rearward to a clutch control arm. The lengths and positions of the bellcranks and the clutch control arm have been adjusted to provide the proper pedal stroke and effort requirements. A stop and a spring have usually been provided to establish the normal pedal position and to eliminate preload in the clutch cable. The pulley has been positioned so that the cable does not pull on the clutch control arm and result in disengagement of the clutch when the cab is tilted. This arrangement is desirable, since the vehicle could be parked with the brakes released but the transmission in gear, and the release of the clutch as the cab is tilted could result in unexpected movement of the vehicle.

However, most traditional mechanical linkages would no longer function in a tilt-cab vehicle equipped with cab suspension which permits substantial relative motion between the chassis. When the cab moves vertically with respect to the chassis, the cable would become slack as the cab moves downwards from its nominal ride position, and as the cab moves upwards, the bellcrank would be restrained by its stop, and the clutch control arm would be rotated, thereby tending to disengage the clutch. In addition, operation of the clutch by the operator would generate a substantial force in the cable which would tend to make the cab deflect on its suspension.

An important object of the present invention is to provide a cable-and-pulley clutch actuation system that retains the stated operational advantages of such a system and which also functions properly in a cab suspension system. In this invention, clutch operation and adjustment are not affected by the normal motion of the cab on its suspension, and the clutch actuation forces do not cause the cab to move on its suspension.

3. Problems encountered in a shift linkage for a tilt-cab truck with cab suspension.

Shift linkages must also accommodate the articulation of the cab, and shift mechanisms usually pose very complicated control functions. Three primary approaches are commonly employed today. U.S. Pat. No. 4,276,953 describes in detail the elements of those systems as well as the relative merits of each. A summary of those three systems is presented here.

(1) In the most commonly employed system, a frame-mounted shift "tower" supports a shifter control unit and a small "subfloor" seals against the underside of the cab floor. A rod and two universal joints connect the control unit to a transmission-mounted slave unit. Within the slave unit is the mechanism which actually shifts the transmission gears. When the cab is tilted, the cab floor simply lifts away from the subfloor leaving the entire shifter system behind.

(2) A break-away shift linkage has a frame-mounted control unit, but the shift stick is attached to the cab. Some method of disengagement of the shift stick from the control unit is provided to permit the cab to tilt.

(3) A third approach utilizes two control shafts which act through a special over-center universal joint located near the cab pivot axis. The operation of this device is described in detail in U.S. Pat. No. 4,276,953.

None of these three mechanisms suitably addresses the requirements for a shifter system for a suspended cab, where substantial relative movement may occur between the cab and the chassis.

It might be thought that the subfloor itself (in either of the first two approaches) could be spring-mounted so that it could follow the vertical excursions of the cab while maintaining a seal with the cab floor. However, that would lead to the serious disadvantage that the shift lever would then move relative to the cab as the cab moves on its suspension, since the shifter control unit itself is still frame-mounted.

In a break-away system, even if it could be configured to accommodate cab motion, wear and alignment problems, which are already objectionable with this type of system, would be aggravated.

Moreover, despite the many advantages of the third system, it cannot accommodate any vertical motion of the cab without resulting in significant motion of the shift lever inside the cab.

Therefore, another object of the invention is to provide a transmission shifter system which is suitable for use on a tilt-cab vehicle equipped with four-point cab suspension.

4. The problem of excessive roll.

Foster's U.S. Pat. No. 3,948,341 states that a stabilizer bar, functioning as an anti-roll device, extends transversely of the vehicle and interconnects the two front suspension arms near their pivotal connections with the cab. A straight bar is shown in one drawing of the patent, apparently for this purpose, but the actual trucks that have been made by Foster's assignee have lacked this feature, apparently due to the lack of space for such a transverse member at the point where it is needed. As a result, the cab has tended to roll slowly from side to side, thereby inducing a seasick-like feeling in the occupants.

Thus, another object of the invention is to provide the needed anti-roll stabilization in a practical manner.

Other problems, not relating especially to the structure shown in the Foster patents, are also significant.

One such problem is that of minimizing friction in a vibration isolation system utilizing low rate springs. It is important that friction be minimized, for friction tends to degrade system performance. In a system utilizing suspension arms, friction in the arms' pivot connections can occur and the problem is aggravated if the pivot bearings are radially loaded, since friction force is proportional to normal force. For example, in the Foster U.S. Pat. No. 3,948,341, the air spring bears on the underside of the suspension arm directly beneath the cab pivot, so that the front pivot is loaded by the full cab weight, and the front pivot is a potential source of troublesome friction.

Hence, another object of the invention is to minimize friction at the pivots of the rigid suspension members.

Problems can also arise from lateral roll at the rear of the cab. A typical truck frame is a relatively limber structure which tends to twist toward a helical shape when the truck is driven over uneven terrain. However, the truck cab is a box-like and relatively rigid structure and cannot sustain the same kind of deflections as can the chassis without being damaged. It is common, therefore, to allow for some relative motion between the cab and the chassis at the rear cab mounts, preferably in both the vertical and horizontal directions (Cf. U.S. Pat. No. 4,279,321 "Mounting and Latching System for a Truck Cab").

While vertical motion is easily accommodated by the air springs, horizontal compliance must also be provided. This is not done in the prior art relating to four-point suspended cabs, and to solve this problem is another object of the invention.

An additional problem is that of protecting the rear air springs from over-extension during cab tilting. When the cab is to be tilted, the rear latches may be opened by the hydraulic pressure in the tilt system. The rear of the cab can then be moved up and away from the frame. The rear air springs, relieved of the weight they were carrying, extend, and continue to extend until the rear leveling valves, sensing that the cab is too high off the frame, bleed all the air from the springs. It is necessary to prevent the springs from over-extending, and another object of the invention is to provide novel means for so doing.

There are also other problems relating to relative motion within various sub-systems. All the sub-systems which interface between the cab and the chassis (e.g., the steering, throttle, and the cab tilt system, as well as the clutch and gear shifter systems discussed earlier) must allow for whatever relative motion might result from the movement of the cab relative to the chassis because of the suspension system there, yet each of these sub-systems must continue to fulfill its normal functions. In order to solve these problems, the present invention utilizes structures that are very different from those in prior four-point suspension systems, so that the present invention achieves the system interfaces in a novel and significantly different manner. Simplicity and long life during use are achieved in the steering and cab tilt systems, for example, as will be seen from the detailed description below.

SUMMARY OF THE INVENTION

The tilt-cab truck of this invention comprises a main frame supported on wheels through a primary suspension system and a tilt cab pivoted to the main frame through and supported thereon by a secondary suspension system. The power cylinder between the cab and the frame is pivoted to each of them at points remote from the main pivot for the cab.

The secondary suspension system includes a pair of front suspension bell cranks, one on each side of the truck. Each bell crank is pivotally connected to the cab in line with the main pivot and has an arm extending substantially horizontally rearwardly therefrom to a second pivotal connection to the main frame; a crank arm extends substantially perpendicularly down from the arm at this second pivotal connection. Each of a pair of front air springs is positioned horizontally, being secured to the main frame at one end, and the crank arm bears on its other end. A single leveling valve connects both of the front air spring means to a source of air pressure.

The forward ends of the two bell cranks are rigidly connected to an anti-roll bar which is made in a modified U-shape, extending down in a curve from the bell crank at each end to a straight portion extending across to the other side of the truck.

Each of a pair of lower latch assemblies is secured to the main frame near the rear of the cab, while each of a pair of upper latch assemblies is releasably secured to one lower latch assembly. Each of a pair of rear links extends horizontally and is pivotally connected at a forward end to a rear portion of the cab and at a rear end to an upper latch assembly. Each link is provided with stop means at each end cooperating with stop means respectively secured to the cab and to the upper latch assembly. Each of a pair of rear air springs is mounted vertically on an upper latch assembly in transverse centered alignment with its associated links, and its upper end bears against the cab. There is a separate leveling means for each rear air spring, both being connected to the source of air pressure.

A pair of front damper snubbers is provided, each adjacent to the main pivot and operatively interposed between the cab and the main frame. Similarly, there is a pair of rear damper-snubbers, each adjacent to the rear end of one rear link and interposed between the cab and the upper latch assembly. Each damper-snubber comprises means for increasing the stiffness of its reaction in non-linear increasing relation to its compression, such that no rigid stop is ever reached, so that bumping there is prevented.

Preferably, both the front and rear pivots for the forward ends of the bell cranks comprise anti-friction bearings. In order to provide horizontal compliance for the cab, the rear link pivots are rubber-bushed. Also, extension stops are provided for the rear springs in order to prevent over-extension during cab tilt.

The damper snubber may comprise a vertical cylinder assembly having an outer cylinder and an inner cylinder inside and spaced from the outer cylinder to provide an annular space between them. The cylinder assembly has an upper end closure and a lower end closure with a lower mounting bracket. The upper end of the inner cylinder lies below that of said outer cylinder, and a series of restricted ports above and below the vertical center of the inner cylinder, lead into the annular space. A piston is normally axially centered in the inner cylinder, dividing it into upper and lower chambers normally of equal length, a piston rod extending through the upper end closure and having an upper mounting bracket at its upper end. The inner cylinder is filled with hydraulic fluid both above and below the piston, and the annular space is filled with the same fluid except for an air space lying above the upper end of the inner cylinder. Each of the upper and lower end closures has check valve means enabling flow from the annular space into the upper chamber when the piston moves downwardly and into the lower chamber when the piston moves upwardly.

The steering linkage comprises a steering wheel in the cab with a first shaft secured to it; this first shaft is slidably mounted to the cab to enable adjustment of steering wheel height. A second shaft is pivoted to the first shaft and has a spline joint telescoping therewith to accommodate the steering wheel adjustment. A third shaft is pivoted to the second shaft and is rotatably mounted in a housing secured to the cab. A fourth shaft is attached to the steering gear and is pivoted to the third shaft. This fourth shaft also has a spline joint enabling it to telescope to accommodate cab tilting. The shaft pivoting means preferably comprises a universal joint in each instance.

The clutch linkage and interface includes a clutch pedal in the cab connected to one end of a pivoted clutch bellcrank, a cable being connected to the other end. The cable passes along the forward and bottom runs of a first pulley mounted rotatably to the cab in line with the axis of the main pivot. A second pulley is mounted to the frame below and to the rear of the first pulley, and the cable runs on top of it and is parallel to the horizontal arm of the adjacent front suspension bellcrank, and the cable is connected thereafter to a clutch control arm. There may also be a third pulley mounted to the frame and engaging the cable to insure contact of the cable with said second pulley at all times.

A transmission, mounted on the frame, is connected in a novel manner to the gearshift lever in the cab. An upper shift rod is connected to the gearshift lever by a universal joint, while a lowershift rod is connected to the transmission by a universal joint. An over-center universal joint and slider bearing assembly connects the upper shift rod to the lower shift rod and is itself attached to and moves with a forward suspension bellcrank.

DESCRIPTION OF AN EMBODIMENT OF THE PETERBILT CAB SUSPENSION SYSTEM

The suspension system in general (FIGS, 1-10)

Figure 5:
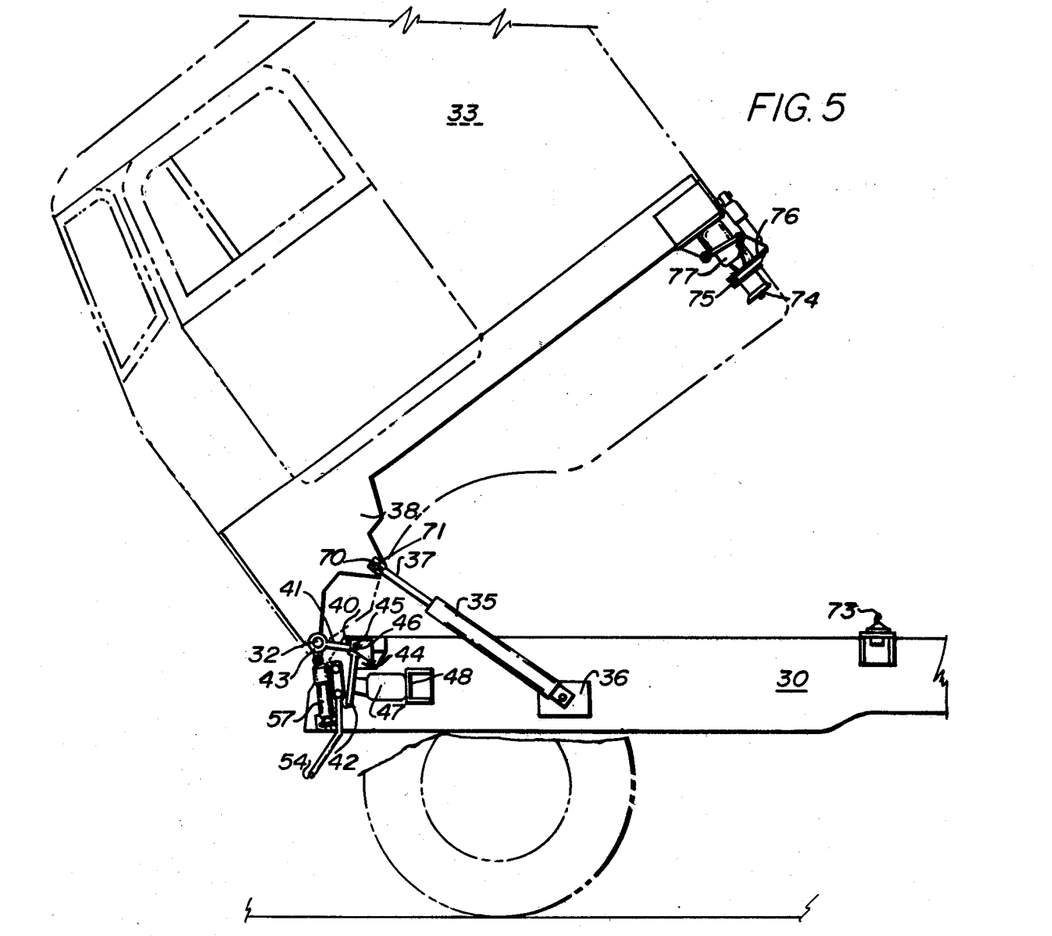
FIG. 5 is a view similar to FIG. 4 with the cab tilted, showing the cab in outline and the wheels in phantom.
Figure 6:
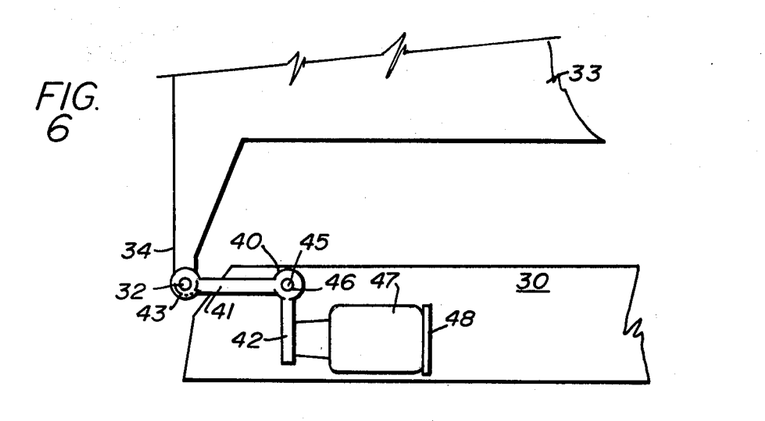
FIG. 6 is a diagrammatic somewhat schematic fragmentary view of the front cab suspension on the left side.

To a truck frame 30, provided with a primary suspension system, not shown, is bolted a backing plate 44 supporting a projecting pivot pin 31 on each side of its front end. A cab 33 has a depending front bracket 34 on each side supporting a main pivot pin 32. A tilt cylinder 35 on each side of the truck is pivoted to a bracket 36 on the frame 30, while its connecting rod 37 is pivoted to a bracket 38 on the cab enabling the cab to be tilted as shown in FIG. 5.

On the left side of the truck is a bellcrank 40 having a horizontal arm 41, a depending arm 42, preferably vertical, and a plate 42a joining the two arms 41 and 42. There is a similarly constructed bell crank 40a (see FIG. 2) on the right side of the vehicle. The horizontal arm 41 is pivotally connected by an anti-friction bearing 43 to the cab 33, preferably to the main pivot 32. The bearing 43 may be a tapered roller bearing or a needle bearing, for example. The aft end of the arm 41 is pivotally connected to the projecting pin 31 of the frame 30 by an anti-friction bearing 46, such as a needle bearing or tapered roller bearing. The arm 41 serves to control fore-aft and sideways motion of the cab 33 while allowing the cab 33 to move up and down relatively freely.

Figure 1:
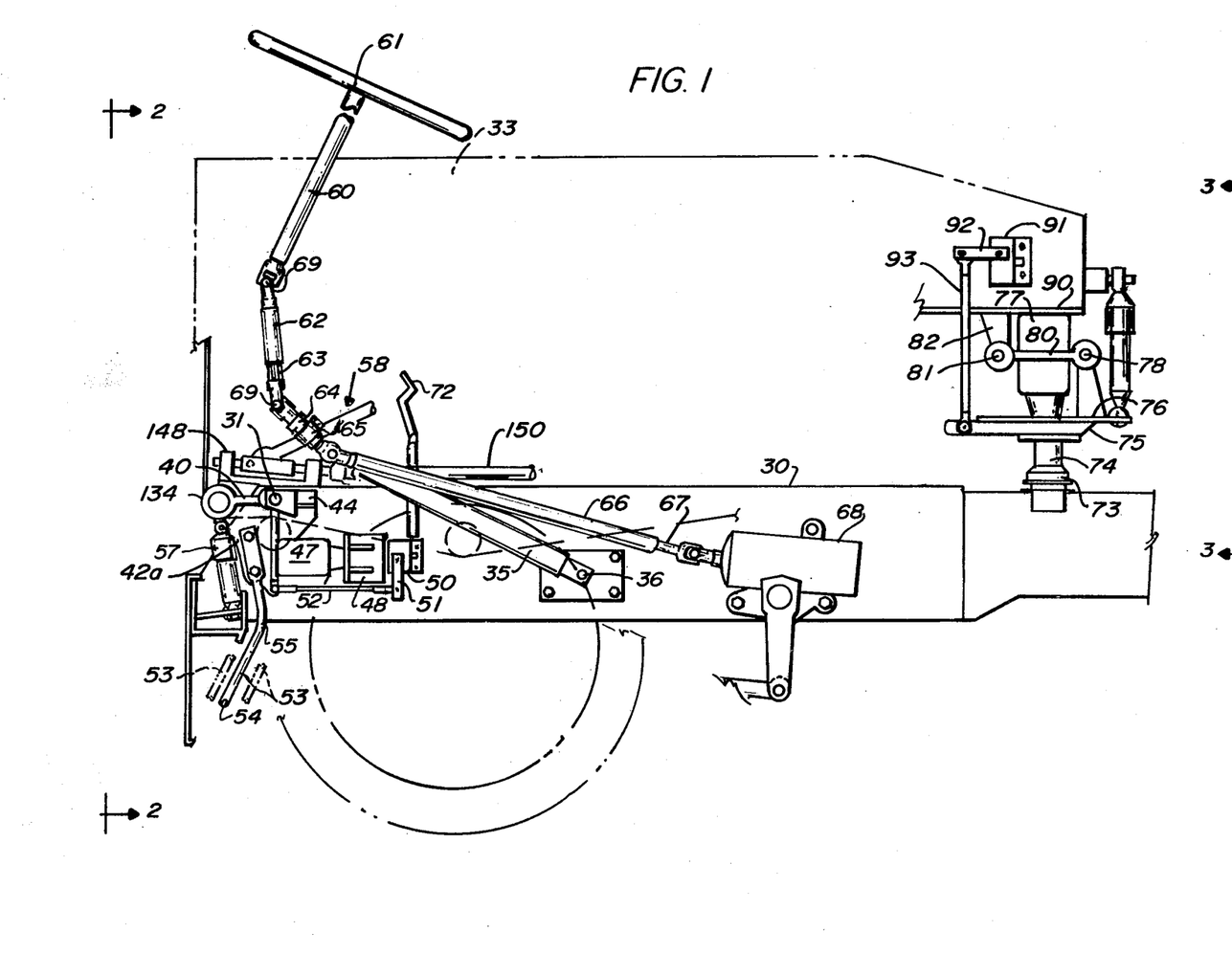
FIG. 1 is a fragmentary view in side elevation of major elements of a tilt-cab truck and a tilt-cab suspension system embodying the principles of the invention. Portions only of the wheels and cab are shown, and that in outline, and many other parts of the truck omitted for the sake of clarity.
Figure 2:
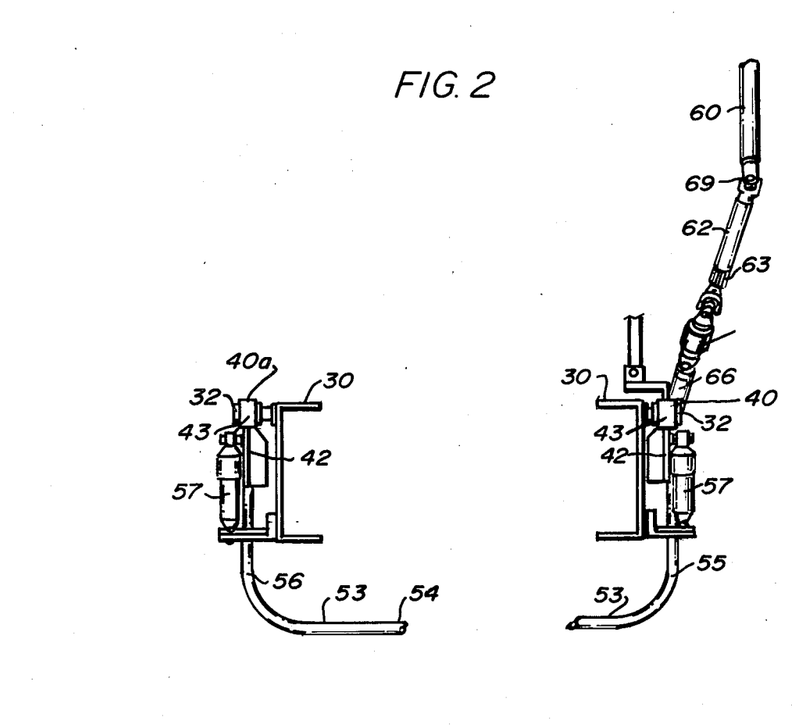
FIG. 2 is a fragmentary view in front elevation of the tilt-cab suspension system of FIG. 1, broken in the middle and with omissions of some parts for the sake of clarity.
Figure 3:
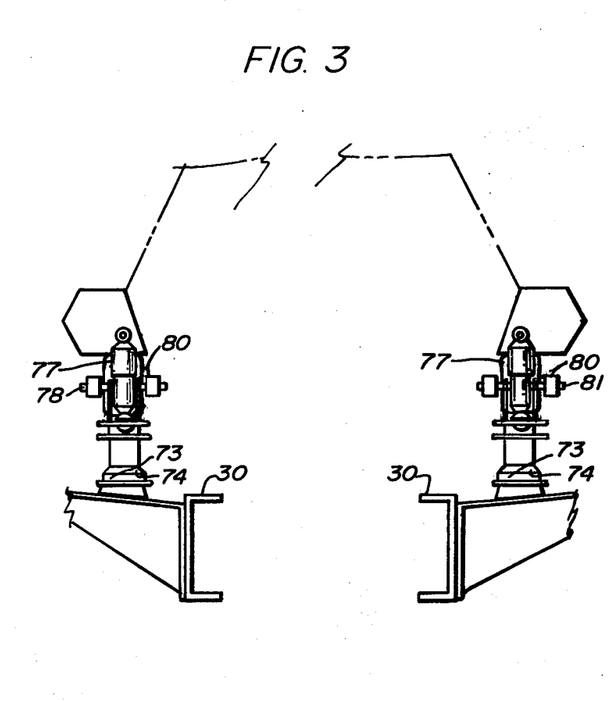
FIG. 3 is a fragmentary view in rear elevation of the tilt-cab suspension system of FIG. 1, also broken in the middle and with some parts omitted for the sake of clarity.

An air spring 47 of the rolling lobe type is mounted horizontally on each side of the truck and is connected at one of its ends to the vertical arm 42, and at its other end to a bracket 48 which is bolted to the frame 30. Both air springs 47 may be connected to the truck's high pressure air supply (not shown here) via a single leveling valve 50 (FIG. 1). The leveling valve 50 has a control lever 51 which is connected to the arm 42 via an adjustable rod 52 having a pivotal attachment at each of its ends.

If the cab 33 is sitting below the desired ride height, the bell crank 40 will be rotated counter-clockwise from the position shown in FIGS. 1 and 4, and the leveling valve rod 52 will transmit this motion to the leveling valve's control lever 51. This will open the leveling valve 50 to admit high-pressure air to the air spring 47, causing the cab 33 to rise to the desired ride height. Similarly, if the cab 33 is too high, the leveling valve control lever 51 will cause the valve 50 to bleed air from the air spring 47 until the cab 33 settles to the desired height.

Bolted to the bell crank plate 42a and to a corresponding plate on the opposite side of the vehicle, is a stabilizer or anti-roll bar 53 having a central horizontal portion 54 and two generally vertical curved portions 55 and 56, one at each end. The shape of the bar 53 enables it to fit into the maze of material at this general location. The bar 53 operates as follows: if the cab 33 moves in a purely vertical up-and-down motion, the anti-roll bar 53 simply "floats" with the bell cranks 40 and 40a, its lower section 54 moving fore and aft as shown by the dashed lines in FIG. 1. If, however, the cab 33 rolls relative to the chassis 30, about an axis parallel to the centerline of the vehicle, then one bell crank 40 tends to rotate clockwise, while the other bell crank 40a tends to rotate counterclockwise, and vice versa. This generates twisting and bending moments in the anti-roll bar 53, which tends to restore the cab 33 to its level position.

Interposed between each bell crank 40, 40a and the frame 30 is a damper-snubber 57, which provides non-linear damping with a progressive hydraulic "bump stop" at each end of its travel, in addition to containing internal valving to otherwise tailor its performance. The damper-snubber 57 will be described in detail later on.

Figures 4, 13, 14:
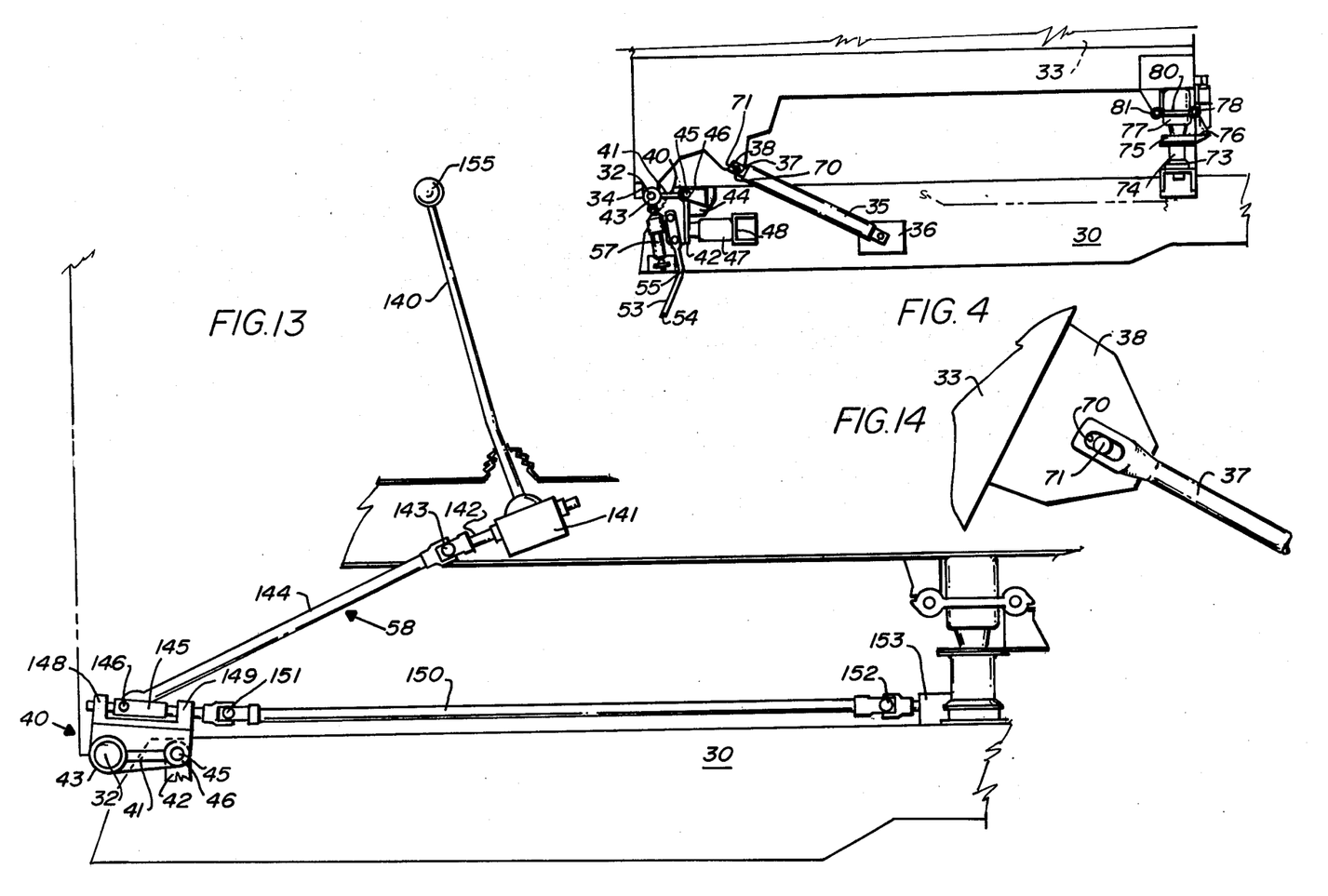
FIG. 4 is a fragmentary view in side elevation of the truck and cab of FIG. 1, omitting many parts but showing the suspension and the cab-tilting cylinder, all in the normal operating position.
FIG. 13 is a similar view showing somewhat diagrammatically a gearshift system for the truck embodying the principles of the invention.
FIG. 14 is a detailed fragmentary view of the upper end of the power tilt cylinder, showing its attachment to the cab.

On the left side of the vehicle only, the bell crank 40 also carries a sliding gear shift actuation mechanism 58 which is shown in FIG. 13 and is described later on.

Also on the left hand side of the vehicle only, there is a pulley 134 pivotally attached to the bell crank 40. This pulley 134 is part of a clutch actuation system which is also described later on.

The vehicle's steering system is also different from that of a typical tilt cab vehicle. A first shaft 60 is attached to a steering wheel 61 and is slidably attached to the cab 33 to allow the driver to adjust the steering wheel to a comfortable height. A second shaft 62 is, by means of a slidable spline joint 63, capable of telescoping to accommodate that adjustment. A third shaft 64 rotates in a housing clamp 65 which is attached to the structure of the cab 33. A final shaft 66 is, by means of a spline joint 67, capable of telescoping in order to accommodate the tilting of the cab 33. The shaft 66 is attached to a steering gear 68, which is located aft rather than at the more common forward position and is supported by the frame 30. All these shafts 60, 62, 64, and 66 are connected in line by successive universal joints 69 of conventional design.

The cab tilt system is of interest. In a typical hydraulic cab tilt system, when the cab is in its normal operating position, the tilt cylinders cannot freely be extending or compressed; therefore, they would normally prevent a cab from moving up and down on a suspension system. In the present invention, the range of the cab's vertical travel on its suspension is very small, and this travel has been accommodated by providing an oblong hole 70 (FIG. 14) in the upper end of each tilt connecting rod 37 and by enabling a pin 71 secured to the cab 33 and joining the cab 33 to the tilt connecting rod 37 to undergo a small sliding motion as the cab 33 moves up and down.

A standard throttle system 72 (FIG. 1) may be used with no essential alteration.

The rear of the cab 33 has many of the same components on each side of the vehicle. On each side, a lower latch mechanism 73 of more or less conventional design is bolted to the frame 30, and an upper latch mechanism 74 is provided for the cab 33. The latches 73 and 74 are firmly attached to one another when the cab 33 is in its normal operating position. When the cab's tilt system is operated, hydraulic pressure causes the lower and upper halves 73 and 74 of a latch mechanism to separate (see FIGS. 7 and 8), so that the cab 33 can be tilted. The upper latch 74 is attached to a cradle 75 having a base 76 to which one end of an air spring 77 (which may be identical to the air springs 47 used at the front of the cab) is attached. The cradle 75 also has a pin 78 which is pivotally attached to the rear ends of two movable links 80, one on each side of each air spring 77.

Figure 9:
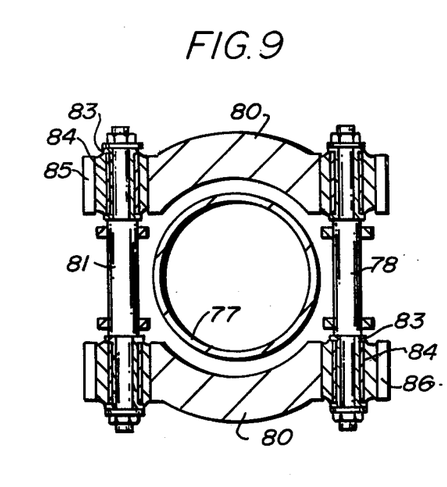
FIG. 9 is a view in section taken along the line 9-9 in FIG. 7.
Figure 10:
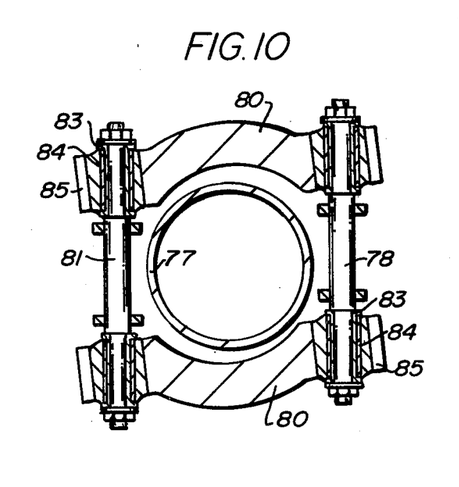
FIG. 10 is a view similar to FIG. 9 illustrating lateral compliance during rough-road operation.

The forward ends of the links 80 are pivotally attached to a pin 81 which depends from a bracket 82 bolted to the rear cab structure. The pivot connection at each end of each link 80, as shown in FIGS. 9 and 10, comprises a bronze bushing 83 encased in a rubber sleeve 84, which in turn is pressed into an annular end 85 of the rigid link 80. While the purpose of the links 80 is, as for the bell crank 40 at the front of the cab 33, to control the fore-aft and sideways motion of the cab 33 while permitting up-and-down motion, the elasticity of the rubber also accommodates some side-to-side motion of the rear of the cab 33, as occurs when the vehicle frame twists, and as can be seen in FIG. 10.

Figures 7, 8:
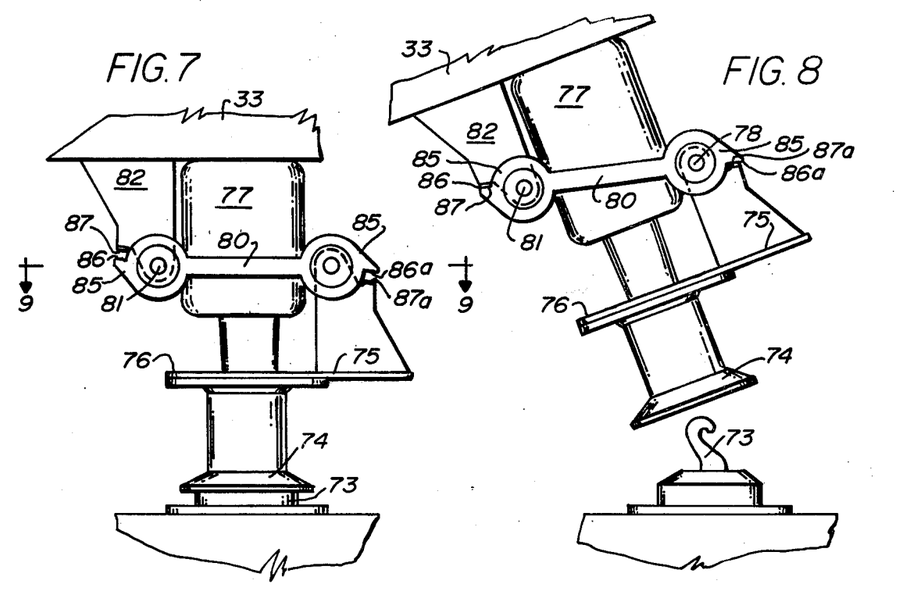
FIG. 7 is a similar view in side elevation of the rear cab suspension on the left side, with the cab latched into its normal operating position.
FIG. 8 is a view similar to FIG. 7 with the cab barely unlatched at the beginning of tilt.

As shown in FIGS. 7 and 8, the annuli 85 have a front stop 86 and a rear stop 86a, which match respectively with a stop 87 on the bracket 82 and a stop 87a on the cradle 75. These limit the angular swing of the links 80.

The bracket 82 has a horizontal shelf 90 (see FIG. 1) to which is attached the upper end of the air spring 77. A leveling valve 91, a control lever 92, an actuating rod 93 pivoted to the lever 92, and to the cradle 75, are used at each side of the rear of the cab 33, so as to regulate the air pressure separately for the two air springs 77 and to keep the cab 33 basically at a uniform distance from the frame 30 regardless of the load the cab 33 is carrying.

DESCRIPTION OF THE PROPOSED EMBODIMENT OF THE DAMPER-SNUBBER 57

Figure 11:
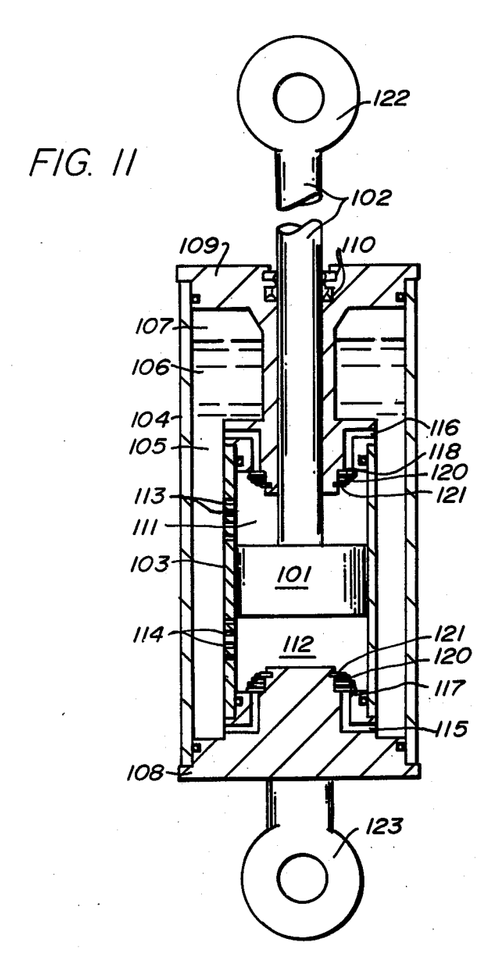
FIG. 11 is a view in elevation and in section of one of the damper-snubbers of FIG. 1.

A presently preferred embodiment of a damper-snubber 57 for use with the suspension of this invention is shown in cutaway form in FIG. 11. It comprises a piston 101 to which is attached a piston rod 102. The piston 101 is normally axially centered in and is able to slide in an inner cylinder 103 which is in turn enclosed in an outer cylinder 104, thereby providing an annular space 105. Both the inner and outer cylinders and the space 105 are filled with hydraulic fluid 106, except for an air reservoir 107 at the top of the space 105. The cylinders 103 and 104 are sealed at one end by a lower end cap 108 and at the other end by an upper end cap 109 through which the piston rod 102 passes. The small air reservoir 107 over the fluid 106 allows for the volume of the fluid displaced by the piston rod 102 when the piston 101 moves in the inner cylinder 103. This air reservoir 107 could be replaced by a resilient elastomeric pad which might have nitrogen bubbles encapsulated in rubber (not shown). Appropriate seals 110 are fitted around the piston rod 102 to prevent fluid leakage.

The piston 101 divides the cylinder 103 into two variably sized chambers, an upper chamber 111 and a lower chamber 112. The inner cylinder 103 is provided with a series of small orifices 113 above center and another series of small orifices 114 below center, so positioned that they are gradually covered by the piston 101 as it travels towards the end of the inner cylinder 103, the orifices 113 and 114 which are nearest each end of the cylinder 103 being so placed that they will be covered by the piston 101 before the piston 101 contacts either the lower end cap 108 or the upper end cap 109, thereby providing means for preventing bottoming-out of the piston 101 at each end. The end caps 108 and 109 are each equipped with a relatively large number of drilled passages 115 and 116, respectively. These passages 115 and 116 are covered at their inner ends by movable valve plates 117 and 118, repectively, preferably in the form of thin flat metal rings. The valve plates 117 and 118 are normally held by springs 120 so as to close off the passages 115 and 116. The springs 120, which are shown as coil springs, could instead be springs of the wave washer type or of the type commonly known as "finger springs". The springs 120 may be retained by an external clip ring 121 of standard design.

The valve plates 117, 118, springs 120, passages 115, 116, and retaining rings 121 act in concert as check valves. For piston travel down toward the valve in the end cap 108, the valve ring 121 is held in its normal closed position by its spring 120, as well as by the pressure of the fluid. For piston travel up away from the end cap 108, the relatively low pressure in the volume of the lower chamber 112 causes fluid to be drawn from the annular space 105 into the inner cylinder 103 via the drilled passages 115, overcoming the resistive force of the spring 120 and lifting the valve plate 117 away from its normal sealed position. The action in the upper chamber 111 is similar but opposite in respect to the direction of movement of the piston 101.

End fittings 122 and 123 are respectively attached to the piston rod 102 and to the lower end cap 108 for the purpose of attaching the device pivotally to the cab 33 and to the chassis 30.

In operation, the damper-snubber 57 serves to damp out oscillations of the cab 33 and to limit its travel with a progressive hydraulic snubbing action. It is optimized for this role in being velocity-stiffening, position-sensitive, and center-seeking.

Velocity-stiffening means that for a given point in the stroke of the piston 101 and for a given direction of piston travel, the damper force is approximately proportional to the square of the piston velocity.

Position-sensitive means that as the piston 101 nears the end of its stroke at a constant velocity, the damper force asymptotically approaches infinity. This results in hydraulic snubbing action so that the piston 101 cannot "bottom out" in a hard metal-to-metal contact at either end of its travel.

Center-seeking results from the damper-snubber 57 being equipped with the double check valves at the passages 115 and 116, such that very little force is required to return the piston 101 to its mid-stroke position, compared to that required to force it towards the end of its stroke. This prevents the piston 101 from "hanging up" near the end of its stroke where the damping force is extremely heavy. Instead, it always tends to seek the mid-stroke position where the damping is light.

The check valves at either end of the inner cylinder 103 are made sufficiently large that the force generated on the suction side of the piston 101 is insignificant compared to the force generated on the compression side.

In order to obtain the desired ratio of jounce damping force to rebound damping force, the orifices 113 and 114 must be sized correctly, as described below.

When the piston 101 starts at mid-stroke and travels towards the lower end cap 108 it expels through the orifices 114 a volume of fluid 106 equal to the area of the entire face of the piston 101 times the distance traveled. When, however, the piston 101 starts at midstroke and travels an equal distance towards the upper end cap 109, a smaller volume of fluid is expelled, equal to the piston area minus the rod area times the distance traveled. If the piston speed is the same in each case, then assuming there are the same number of orifices in the lower end of the cylinder 103 as in the upper end, and that all orifices are of the same diameter, the speed of the fluid through the orifices will be less when the piston travels upwardly, and the damper force generated will likewise be less.

If one wishes to have the damper force be the same for travel in either direction, it is necessary to have either the number of orifices or the diameter of the orifices be different at opposite ends of the inner cylinder.

Figure 12:
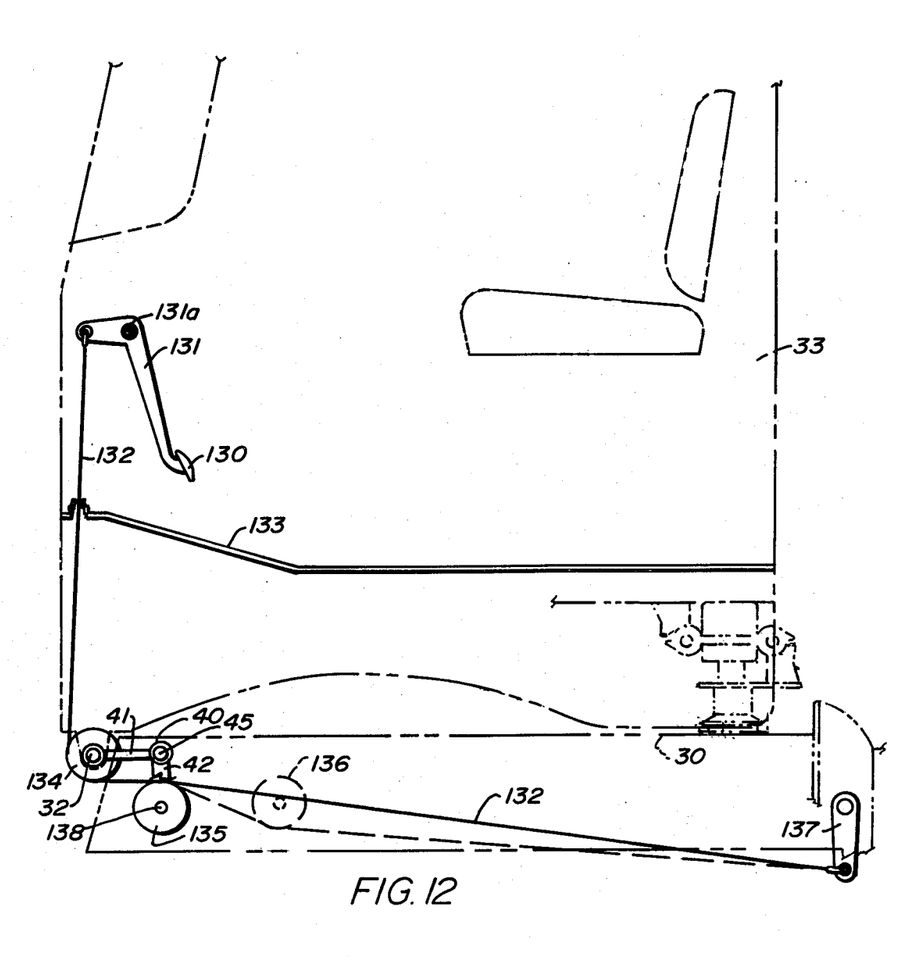
FIG. 12 is a simplified view of the front portion of the truck showing, somewhat diagrammatically, clutch linkages embodying the principles of the invention.

Preferred Embodiment of the Clutch Actuating Linkage (FIG. 12)

FIG. 12 depicts a portion of the tilt-cab 33 and of the frame 30, omitting some of the springing, damping, and travel-limiting means, since they are not relevant to the clutch structures. The forward end of each bellcrank 40 is pivotally attached to the main pivot 32 on the cab 33, and the rearward ends are pivotally attached to the stationary pivots 45 on the chassis 30. As the cab 33 moves on its suspension, it travels generally up and down along an arcuate path defined by the bellcranks 40 and the main pivot 32, which is the pivot about which the cab 33 is tilted for servicing.

A clutch pedal 130 is mounted on a bell-crank 131, which, in turn, is pivotally mounted to the cab 33 by means of a pivot 131a. The bellcrank 131 is attached to a cable 132 within the cab 33. The cable 132 descends through a cab floor 133 and is directed through a set of two pulleys 134 and 135, and possibly a third pulley 136 to a clutch control arm 137.

The forward pulley 134 is located on the axis of the main pivot 32 and moves with the cab 33 as the cab moves on its suspension. The second pulley 135 is attached to the chassis 30 and turns on a pivot 138 located directly below the rear bellcrank pivot shaft 45. The pulley 135 is located a distance below the link pivot shaft 45 such that the cable 132 running between the pulleys 134 and 135 is parallel to the horizontal arm 41.

As the cab 33 moves up or down on its suspension, the forward pulley 134 follows the same path as the main pivot 32. For this geometry, the developed length of the path that the cable 132 must follow remains essentially unchanged as the cab 33 moves. Thus, the clutch operation and adjustment is unaffected by the vertical excursions of the cab 33.

A third pulley 136 is advisable and may be required to insure that the cable 132 remains in contact with the pulley 135, depending on the angle of the cable 132 to the rear of the pulley 135 and the travel of the suspension. The geometry is not mathematically exact, but since the suspension links cannot rotate without limit, for the normal geometries that would be employed on an actual cab suspension system, the error is insignificant.

Two functional requirements are satisfied by the preferred embodiment of the clutch actuating linkage: first, clutch operation and adjustment are not affected by the normal motion of the cab on its suspension, and, second, clutch actuation forces do not cause the cab to move on its suspension.

Preferred shifter mechanism (FIG. 13)

In a shifter system like that defined in U.S. Pat. No. 4,276,953, when the transmission is engaged in a particular gear, the slave unit shaft and lower shift rod are restrained from translating. As the cab moves up or down, the upper shift rod forces the control unit shaft to translate, thereby moving the shift stick within the cab. The actual movement of the shift lever is dependent upon the specific system geometry.

FIG. 13 shows a modification and improvement to the system of U.S. Pat. No. 4,276,953. Here there is a gear shift lever 140 with a shift control unit 141 and a slidable shaft 142 connected by a universal joint 143 to an upper shift rod 144. The shift rod 144 is connected by an over-center universal joint 146 to a slider assembly 145 that can slide back and forth in bearings 148 and 149 which are rigidly attached to, and move with, the suspension bell crank arm 41. The slider assembly 145 is connected to a lower shift rod 150 by a universal joint 151. The rod 150 is connected by another universal joint 152 to a transmission 153. Thus, as the cab 33 moves relative to the chassis 30, the over-center universal joint assembly 146 moves as well and in a compensatory manner that minimizes the movement of the shift lever 140 within the cab 33.

The axis along which the over-center universal joint 146 of the assembly 147 slides is defined by the positions of the two slider bearings 148 and 149, and these are attached to the arm 41. The position of the joint 146 along that axis is determined by the geometry of the lower shift rod 150. With the transmission 153 engaged in gear, the lower shift rod 150 cannot translate. As the cab 33 moves up or down, the bellcrank 40 rotates, causing the universal joint just behind the over-center joint 146 to move up or down slightly along an arcuate path defined by the lower shift rod 150. This will in turn determine where the over-center joint 146 will be for a given position of the bellcrank 40. The resulting path taken by the joint 146 very closely maintains a constant distance between the over-center joint 146 and the upper universal joint 143, thus resulting in very little motion of the shift lever 140 within the cab 33. For example, in a preferred embodiment, as the cab 33 goes through its full vertical range of 1¼ inches travel, the shift knob 155 in the cab moves fore-and aft through only a range of about 5/32 inch.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A tilt-cab truck comprising:
    a main frame supported on wheels through a primary suspension system,
    a tilt cab having main pivot means,
    a pair of front suspension bell cranks, one on each side of said truck, each having a first pivotal connection to said main pivot means and having an arm extending substantially horizontally rearward therefrom to a second pivotal connection to said main frame and having a crank arm extending substantially perpendicularly down from said arm at said second pivotal connection,
    power cylinder means between and connected to said cab and said frame at pivot means that are both spaced away from said main pivot means,
    anti-roll means rigidly connected at each end to said bell crank and extending down therefrom and then laterally across to the other side of said truck,
    a pair of front air spring means positioned substantially horizontally and secured to said main frame at one end with said crank arm bearing on its other end,
    first leveling means for maintaining cab height relative to said frame connected to said front air spring means and to a source of air pressure therefor,
    a pair of lower latch assemblies each secured to said main frame near the rear of said cab,
    a pair of upper latch assemblies, each releasably secured to a said lower latch assembly,
    a pair of rear link means extending horizontally, each pivotally connected at one end to a rear portion of said cab and at another end to a said upper latch assembly,
    a pair of rear air spring means each mounted on a said upper latch assembly and having an upper end bearing against said cab,
    second leveling means for each said rear air spring means connected to said source of air pressure for maintaining said cab height relative to said frame,
    a pair of front damper-snubbers each adjacent to said main pivot means and operatively interposed between said cab and said main frame, and
    a pair of rear damper-snubbers each interposed between said cab and said upper latch assembly,
    each said damper-snubber comprising hydraulic cushioning means for preventing bottoming out at each end of its stroke.

2. The tilt-cab truck of claim 1 wherein each said damper-snubber comprises velocity-stiffening means for changing the stiffness of its reaction in non-linear increasing relation to its velocity.

3. The tilt-cab truck of claim 1 wherein each said damper-snubber is center-seeking with identical jounce and rebound damping.

4. The tilt-cab truck of claim 1 wherein said rear air spring means are in centered transverse alignment with their respective link means.

5. The tilt-cab truck of claim 4 wherein each link means comprises two parallel links, one on each side of their associated rear air spring means.

6. The tilt-cab truck of claim 1 wherein each said link means is provided with stop means at each end cooperating with stop means respectively secured to said cab and to said upper latch assembly.

7. The tilt-cab truck of claim 1 wherein said first pivoted connection and said second pivoted connection of said bell crank each comprises anti-friction bearings.

8. The tilt-cab truck of claim 1 wherein all the pivoted connections of the rear links comprise elastomer-encased bearing bushings to impart flexibility in all directions.

9. The tilt-cab truck of claim 1 wherein said front leveling means comprises a leveling valve for sending air into said frame air spring means from said source in one valve position and bleeding air from said front air spring means to atmosphere in another valve position and having an intermediate passive position, a control lever for determining the position of said valve, and an adjustable rod pivotally connected to said lever at one end and pivotally connected to a said bell crank at its other end.

10. The tilt-cab truck of claim 1 wherein each said rear leveling means comprises a leveling valve for sending air into said rear air spring means from said source in one valve position and bleeding air from its said air spring means in another valve position and having an intermediate passive position, a control lever for determining the position of said valve, and an adjustable rod pivotally connected to said lever at one end and pivotally connected to a said latch means at its other end.

11. The tilt-cab truck of claim 1 wherein the pivotal connection between said power cylinder means and said cab comprises a connecting rod for said power cylinder means having an elongated opening in its upper end and a pivot pin secured to said cab extending through said elongated opening, thereby enabling a limited sliding motion of said cab relative to said connecting rod.

12. The tilt-cab truck of claim 1 wherein each said damper-snubber comprises:
a vertical cylinder assembly having an outer cylinder and an inner cylinder inside and spaced from said outer cylinder to provide an annular space between them, said cylinder assembly having an upper end closure and a lower end closure with a lower mounting bracket connected to said main frame in said front damper-snubbers and to said upper latch assembly on said rear damper-snubbers said inner cylinder having its upper end below that of said outer cylinder and having a series of restricted orifices above and below the vertical center of said inner cylinder, leading to said annular space,
a piston normally centered in said inner cylinder to divide it into upper and lower chambers, with a piston rod extending through said upper end closure and having an upper mounting bracket at its upper end connected to said cab,
said inner cylinder being filled with hydraulic fluid both above and below said piston, said annular space being filled with the same fluid except for an air space lying above the upper end of said inner cylinder,
each of said upper and lower end closures having check valve means enabling flow from said annular space into said upper chamber when said piston moves downwardly and into said lower chamber when said piston moves upwardly.

13. The tilt-cab truck of claim 12 wherein said restricted orifices are arranged in series above and below said vertical center at a series of positions at different distances from said vertical center, so that those of one series are covered gradually by said piston moving away from center toward one end of said inner cylinder, the orifices nearest each end being covered before the piston engages the end closure nearest thereto.

14. The tilt-cab truck of claim 13 wherein said check valve means in said end closures comprise: a plurality of drilled passages in each said end closure leading from said annular space into said inner cylinder
movable valve plates, covering each said passage at the end of said end closure facing said piston, and spring means urging said valve plates to a normally closed position,
said valve plates moving against said spring means to open said passages when the piston moves away therefrom at a rate sufficient to reduce the pressure of said fluid bearing on said plates a predetermined amount below the pressure normally bearing thereagainst.

15. The tilt-cab truck of claim 1 having a steering linkage, comprising:
a steering gear supported on said frame,
a steering wheel in said cab,
a first shaft secured to said wheel and slidably mounted to said cab to enable adjustment of steering wheel height,
a second shaft pivoted to said first shaft and having a spline joint telescoping therewith to accommodate the stated steering wheel adjustment,
a third shaft pivoted to the second shaft at the opposite end from said second shaft and rotatably mounted in a housing secured to said cab, and
a fourth shaft attached to said steering gear and pivoted to said third shaft at the opposite end from said second shaft and having a spline joint enabling said fourth shaft to telescope to accommodate cab tilting.

16. The tilt-cab truck of claim 15 wherein said shaft pivoting in each instance comprises a universal joint.

17. The tilt-cab truck of claim 1 having:
a clutch pedal in said cab connected to one end of a pivoted clutch bell crank,
a cable connected at one end to the other end of the clutch bell crank,
a first pulley rotatably mounted to said cab in line with the axis of said main pivot, said cable passing along forward and bottom runs of the first pulley,
a second pulley mounted to said frame below and to the rear of said first pulley such that the cable runs on top of it and is parallel to the horizontal arm of the adjacent said suspension bell crank, and
a clutch control arm connected to the distal end of said cable.

18. The tilt-cab truck of claim 17 having a third pulley mounted to said frame and engaging said cable to insure contact of said cable with the second pulley at all times.

19. The tilt-cab truck of claim 1 comprising:
a transmission mounted on said frame,
a gearshift lever in said cab,
an upper shift rod connected to said gearshift lever by a universal joint, a lower shift rod connected to said transmission by a universal joint, and an over-center universal joint and slider bearing assembly connecting said upper shift rod to said lower shift rod and attached to and moving with a said forward suspension bell crank.

20. A tilt-cab truck, including in combination:
a main frame supported on wheels through a primary suspension system,
a tilt cab having main pivot means,
power cylinder means between and connected to said cab and said frame at separate pivot means that are both from said main pivot means, and
a secondary suspension system for supporting said cab, comprising:
a pair of front suspension bell cranks, one on each side of said truck, each having a first pivotal connection to said main pivot means and having an arm extending substantially horizontally rearwardly therefrom to a second pivotal connection to said main frame and having a crank arm extending substantially perpendicularly down from said arm at said second pivotal connection,
anti-roll means rigidly connected at each end to said bell crank and extending down therefrom and then laterally across to the other side of said truck,
a pair of front air spring means positioned substantially horizontally and secured to said main frame at one vertical end with said crank arm bearing on its other vertical end,
single first leveling means for maintaining cab height relative to said frame, connected to both of said front air spring means and to a source of air pressure therefor,
a pair of lower latch assemblies each secured to said main frame near the rear of said cab,
a pair of upper latch assemblies, each releasably secured to a said lower latch assembly,
two pairs of rear links extending horizontally, each link pivotally connected at a forward end to a rear portion of said cab and at a rear end to a said upper latch assembly, each said link being provided with stop means at each end cooperating with stop means respectively secured to said cab and to said upper latch assembly,
a pair of rear air spring means each vertically mounted on a said upper latch assembly in transverse centered alignment with and in between a said pair of rear links and having an upper end bearing against said cab,
second and third leveling means, one connected to each said rear air spring means and to said source of air pressure, for maintaining cab height relative to said frame,
a pair of front damper snubbers, each adjacent to said main pivot means and operatively interposed between said cab and said main frame, and
a pair of rear damper-snubbers each interposed between said cab and said upper latch assembly,
each said damper-snubber comprising hydraulic cushioning means for preventing bottoming out at each end of its stroke.

21. The tilt-cab truck of claim 20 wherein each said damper-snubber comprises velocity-stiffening means for increasing the stiffness of its reaction in non-linear increasing relation to its velocity.

22. The tilt-cab truck of claim 20 wherein each said damper-snubber is provided with means for rendering it center seeking and providing identical jounce and rebound damping.

23. The tilt-cab truck of claim 20 wherein said first pivoted connection and said second pivoted connection of said bell crank each comprises anti-friction bearings.

24. The tilt-cab truck of claim 20 wherein all the pivoted connections of the rear links comprise elastomer-encased bearing bushings to impart flexibility in all directions.

25. The tilt-cab truck of claim 20 wherein said front leveling means comprises a leveling valve for sending air into said frame air spring means from said source in one valve position and bleeding air from said front air spring means to atmosphere in another valve position and having an intermediate passive position, a control lever for determining the position of said valve, and an adjustable rod pivotally connected to said lever at one end and pivotally connected to a said bell crank at its other end.

26. The tilt-cab truck of claim 20 wherein each said rear leveling means comprises a leveling valve for sending air into said rear air spring means from said source in one valve position and bleeding air from its said air spring means in another valve position and having an intermediate passive position, a control lever for determining the position of said valve, and an adjustable rod pivotally connected to said lever at one end and pivotally connected to a said latch means at its other end.

27. The tilt-cab truck of claim 20 wherein the pivotal connection between said power cylinder means and said cab comprises a connecting rod for said power cylinder means having an elongated opening in its upper end and a pivot pin secured to said cab extending through said elongated opening, thereby enabling a limited sliding motion of said cab relative to said connecting rod.

28. The tilt-cab truck of claim 20 wherein each said damper-snubber comprises:
a vertical cylinder assembly having an outer cylinder and an inner cylinder inside and spaced from said outer cylinder to provide an annular space between them, said cylinder assembly having an upper end closure and a lower end closure with a lower mounting bracket connected to said frame in said front damper-snubbers and to said upper latch assembly on said rear damper-snubbers said inner cylinder having its upper end below that of said outer cylinder and having a series of restricted orifices above and below the vertical center of said inner cylinder, leading to said annular space,
a piston normally centered in said inner cylinder to divide it into upper and lower chambers, with a piston rod extending through said upper end closure and having an upper mounting bracket at its upper end connected to said cab,
said inner cylinder being filled with hydraulic fluid both above and below said piston, said annular space being filled with the same fluid except for an air space lying above the upper end of said inner cylinder,
each of said upper and lower end closures having check valve means enabling flow from said annular space into said upper chamber when said piston moves downwardly and into said lower chamber when said piston moves upwardly.

29. The tilt-cab truck of claim 28 wherein said restricted orifices are arranged in series above and below said vertical center at a series of positions at different distances from said vertical center, so that those of one series are covered gradually by said piston moving away from center toward one end of said inner cylinder, the orifices nearest each end being covered before the piston engages the end closure nearest thereto.

30. The tilt-cab truck of claim 29 wherein said check valve means in said end closures comprise:
  a plurality of drilled passages in each said end closure leading from said annular space into said inner cylinder,
  movable valve plates, covering each said passage at the end of said end closure facing said piston, and
  spring means urging said valve plates to a normally closed position,
  said valve plates moving against said spring means to open said passages when the piston moves away therefrom at a rate sufficient to reduce the pressure of said fluid bearing on said plates a predetermined amount below the pressure normally bearing thereagainst.

31. The tilt-cab truck of claim 20 having a steering linkage, comprising:
  a steering gear supported on said frame,
  a steering wheel in said cab,
  a first shaft secured to said wheel and slidably mounted to said cab to enable adjustment of steering wheel height,
  a second shaft pivoted to said first shaft and having a spline joint telescoping therewith to accommodate the stated steering wheel adjustment,
  a third shaft pivoted to the second shaft at the opposite end from said second shaft and rotatably mounted in a housing secured to said cab, and
  a fourth shaft attached to said steering gear and pivoted to said third shaft at the opposite end from said second shaft and having a spline joint enabling said fourth shaft to telescope to accommodate cab tilting.

32. The tilt-cab truck of claim 31 wherein in each instance where the shafts are pivoted, the pivoting comprises a universal joint.

33. The tilt-cab truck of claim 20 having:
  a clutch pedal in said cab connected to one end of a pivoted clutch bell crank,
  a cable connected at one end to the other end of the clutch bell crank,
  a first pulley rotatably mounted to said cab in line with the axis of said main pivot, said cable passing along forward and bottom runs of the first pulley,
  a second pulley mounted to said frame below and to the rear of said first pulley such that the cable runs on top of it and is parallel to the horizontal arm of the adjacent said suspension bell crank, and
  a clutch control arm connected to the distal end of said cable.

34. The tilt-cab truck of claim 33 having a third pulley mounted to said frame and engaging said cable to insure contact of said cable with the second pulley at all times.

35. The tilt-cab truck of claim 20 comprising:
  a transmission mounted on said frame,
  a gearshift lever in said cab,
  an upper shift rod connected to said gearshift lever by a universal joint,
  a lower shift rod connected to said transmission by a universal joint, and
  an over-center universal joint and slider bearing assembly connecting said upper shift rod to said lower shift rod and attached to and moving with a said forward suspension bell crank.

36. A damper-snubber for cab suspension of a tilt-cab on a truck frame including in combination:
  a vertical cylinder assembly having an outer cylinder and an inner cylinder inside and spaced from said outer cylinder to provide an annular space between them, said cylinder assembly having an upper end closure and a lower end closure with a lower mounting bracket, said inner cylinder having its upper end below that of said outer cylinder and having a series of restricted orifices above and below the vertical center of said inner cylinder, leading to said annular space,
  a piston normally centered in said inner cylinder to divide it into upper and lower chambers, with a piston rod extending through said upper end closure and having an upper mounting bracket at its upper end,
  said inner cylinder being filled with hydraulic fluid both above and below said piston, said annular space being filled with the same fluid except for an air space lying above the upper end of said inner cylinder,
  each of said upper and lower end closures having check valve means enabling flow from said annular space into said upper chamber when said piston moves downwardly and into said lower chamber when said piston moves upwardly.

37. The damper-snubber of claim 36 wherein said restricted orifices are arranged in series above and below said vertical center at a series of positions at different distances from said vertical center, so that those of one series are covered gradually by said piston moving away from center toward one end of said inner cylinder, the orifices nearest each end being covered before the piston engages the end closure nearest thereto.

38. The tilt-cab truck of claim 37 wherein said check valve means in said end closures comprise:
  a plurality of drilled passages in each said end closure leading from said annular space into said inner cylinder,
  movable valve plates, covering each said passage at the end of said end closure facing said piston, and
  spring means urging said valve plates to a normally closed position,
  said valve plates moving against said spring means to open said passages when the piston moves away therefrom at a rate sufficient to reduce the pressure of said fluid bearing on said plates a predetermined amount below the pressure normally bearing thereagainst.

39. A steering linkage for a tilt-cab truck having four-point resilient suspension of the cab on the frame of the truck, comprising:
  a steering gear supported on said frame,
  a steering wheel in said cab,
  a first shaft secured to said steering wheel and slidably mounted to said cab to enable adjustment of steering wheel height,
  a second shaft pivoted to said first shaft and having a spline joint telescoping therewith to accommodate the stated steering wheel adjustment,
  a third shaft pivoted to the second shaft at the opposite end from said second shaft and rotatably mounted in a housing secured to said cab, and a fourth shaft attached to said steering gear and pivoted to said third shaft at the opposite end from said second shaft and having a spline joint enabling said fourth shaft to telescope to accommodate cab tilting.

40. The truck of claim 39 wherein the pivoting of the respective said shafts in each instance comprises a universal joint.

41. A clutch control system for a truck having a tilt cab mounted rotatably on a main pivot to a frame and having a suspension system with a suspension link pivoted at one end of said cab on the axis of said main pivot and at the other end to a pivot mounted on said frame rearwardly from said main pivot and substantially level therewith, comprising:
- a clutch pedal in said cab connected to one end of a pivoted clutch bell crank,
- a cable connected at one end to the other end of the clutch bell crank,
- a first pulley rotatably mounted to said cab in line with the axis of said main pivot, said cable passing along the forward and bottom runs of the first pulley,
- a second pulley mounted to said frame below and to the rear of said first pulley such that the cable runs on top of it and is parallel to the horizontal suspension link, and
- a clutch control arm connected to the distal end of said cable.

42. The truck of claim 41 having a third pulley mounted to said frame and engaging said cable to insure contact of said cable with said second pulley at all times.

43. A tilt cab truck having the cab suspended relative to said frame by a resilient suspension including a horizontal link extending rearwardly from the main tilt pivot for said cab to a pivot on said frame, comprising:
- a transmission mounted on said frame,
- a gearshift lever in said cab,
- a gearshift rod connected to said gearshift lever by a universal joint,
- a lower shift rod connected to said transmission by a universal joint, and
- an over-center universal joint and slider bearing assembly connecting said upper shift rod to said lower shift rod and attached to and moving with a suspension link.

* * * * *